United States Patent
Pankaj et al.

(10) Patent No.: US 9,055,596 B2
(45) Date of Patent: Jun. 9, 2015

(54) METHODS AND APPARATUSES FOR SELECTIVELY RESETTING AND TRANSFERRING A WIRELESS COMMUNICATION CHANNEL

(71) Applicant: QUALCOMM Incorporated, San Diego, CA (US)

(72) Inventors: Fnu Pankaj, San Diego, CA (US); Sivaram S. Palakodety, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 13/689,435

(22) Filed: Nov. 29, 2012

(65) Prior Publication Data

US 2013/0136021 A1   May 30, 2013

Related U.S. Application Data

(60) Provisional application No. 61/565,360, filed on Nov. 30, 2011.

(51) Int. Cl.
*H04W 72/08* (2009.01)
*H04W 36/00* (2009.01)
*H04L 1/18* (2006.01)
*H04W 76/06* (2009.01)

(52) U.S. Cl.
CPC ........ *H04W 72/085* (2013.01); *H04W 36/0027* (2013.01); *H04W 76/064* (2013.01); *H04L 1/1822* (2013.01); *H04L 1/1835* (2013.01)

(58) Field of Classification Search
CPC .......... H04W 36/0027; H04W 72/085; H04W 76/064
USPC ....................................................... 370/252
See application file for complete search history.

(56) References Cited

U.S. PATENT DOCUMENTS

2011/0103326 A1   5/2011   Kim et al.

FOREIGN PATENT DOCUMENTS

| EP | 1465369 A1 | * 10/2004 |
| WO | 2010054376 A1 | 5/2010 |
| WO | WO 2010054376 A1 | * 5/2010 |

OTHER PUBLICATIONS

3rd Generation Partnership Project; Technical Specification Group Radio Access Network; Radio Resource Control (RRC); Protocol specification (Release 10), 3GPP Standard; 3GPP TS 25.331, 3rd Generation Partnership Project (3GPP), Mobile Competence Centre ; 650, Route Des Lucioles ; F-06921 Sophia-Antipolis Cedex ; France, vol. RAN WG2, No. V10.5.0, Oct. 2, 2011, pp. 1-1882, XP050554320, [retrieved on Oct. 2, 2011].
International Search Report and Written Opinion—PCT/US2012/050442—ISA/EPO—Apr. 12, 2013.

* cited by examiner

*Primary Examiner* — Charles C Jiang
*Assistant Examiner* — Thad Defauw
(74) *Attorney, Agent, or Firm* — Charles Chesney

(57) ABSTRACT

The present disclosure presents methods and apparatuses for selective channel reset. For example, the disclosure describes example methods that may include determining that a candidate cell exhibits superior communication properties on a carrier than does a serving cell. In an aspect, this carrier may correspond to an active serving cell channel. The example methods may also include adding a reset flag to a channel reconfiguration message based on the determining, where the reset flag instructs a user equipment to reset a subset of a set of channels associated with the serving cell and the subset includes the channel. Furthermore, example methods may include transmitting the channel reconfiguration message, for example, to a user equipment. Thus, a specified subset of channels associated with the user equipment may be reset, which reduces the signaling load, complexity, and power drain associated with legacy channel reset methods and apparatuses.

40 Claims, 8 Drawing Sheets

METHODS AND APPARATUSES FOR SELECTIVELY RESETTING AND TRANSFERRING A WIRELESS COMMUNICATION CHANNEL

CLAIM OF PRIORITY UNDER 35 U.S.C. §119

The present Application for Patent claims priority to Provisional Application No. 61/565,360 filed Nov. 30, 2011, entitled "Method and Apparatus for Selectively Resetting and Transferring a Wireless Communication Channel," which is assigned to the assignee hereof, and hereby expressly incorporated by reference herein.

BACKGROUND

1. Field

Aspects of the present disclosure relate generally to wireless communication systems, and more particularly, to wireless channel control.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, currently, a multi-carrier user equipment (UE) may have more than one active High Speed Media Access Channel (MAC-HS) open at a given time. Each of these channels may facilitate UE communication with different cells serviced by one or more base stations. This functionality exists with all multi-flow scenarios—for example, Single Frequency Dual Cell (SFDC) and Dual Frequency Dual Cell (DFDC). Due to various conditions, such as signal strength or quality, a Radio Network Controller (RNC) may choose to transfer the MAC-HS channels from one base station to a second base station (or one cell to another cell). This may occur, for example, when a particular channel would have more robust data transfer if handed off to the second base station.

According to current operational norms, when a MAC-HS channel is transferred, the RNC must first reset not only the MAC-HS channel that is to be transferred, but all MAC-HS channels associated with the UE. For example, High Speed Packet Access (HSPA) specifications allow base stations to trigger reset of all MAC-HS channels on a connected UE by sending to the UE an over the air (OTA) message such as a Physical Channel Reconfiguration (PCR), Radio Bearer Reconfiguration (RBR), or Transport Channel Reconfiguration (TCR) message. The PCR message includes a flag (mac-hsResetIndicator), which, if set to true, instructs the UE to reset all of its MAC-HS channels. The message, however, cannot instruct the UE to reset or transfer a particular MAC-HS channel or a subset of all UE MAC-HS channels.

As a result, if more than one MAC-HS channel is active on a particular UE, the RNC cannot instruct the UE to reset a subset of all active MAC-HS channels. Instead, when a single active MAC-HS channel is to be reset, a RNC must instruct the UE to reset all of its active MAC-HS channels. In some situations, this forces the UE to perform reset operations on some active MAC-HS channels that are not in need of reset. These unneeded reset operations result in performance penalties, loss of data, bandwidth waste, and loss of battery life.

Thus, improved methods and apparatuses for resetting wireless communication channels are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents methods and apparatuses for selective channel reset. For example, the disclosure describes example methods that may include determining that a candidate cell exhibits superior communication properties on a carrier than does a serving cell. In an aspect, this carrier may correspond to a channel in use by the serving cell. The example methods may also include adding a reset flag to a channel reconfiguration message based on the determining, where the reset flag may correspond uniquely to the channel and can instruct the UE to reset the channel. Additionally or alternatively, the reset flag can instruct the UE to reset a subset of a set of channels associated with the serving cell, and the subset may include the channel. Furthermore, example methods may include transmitting the channel reconfiguration message, for example, to a UE.

Additionally, the present disclosure presents at least one processor configured for selective channel reset, which may include code for determining that a candidate cell exhibits superior communication properties on a carrier than does a serving cell, adding a reset flag to a channel reconfiguration message based on the determining, and transmitting the channel reconfiguration message. Furthermore, the disclosure presents, in an aspect, a computer program product that may contain executable instructions for determining that a candidate cell exhibits superior communication properties on a carrier than does a serving cell, adding a reset flag to a channel reconfiguration message based on the determining, wherein the reset flag instructs a user equipment to reset a subset of a set of channels associated with the serving cell and wherein the subset includes the channel, and transmitting the channel reconfiguration message.

In further example aspects, the present disclosure presents example methods for selective channel reset, which may include monitoring communication properties of a candidate cell, and transmitting a measurement report reporting the communication properties, receiving a channel reconfiguration message in response to transmitting the measurement report. In an aspect, the channel reconfiguration message may contain one or more reset flags associated with one or more channels in use by a serving cell. Furthermore, such example methods may include resetting the one or more channels based on the channel reconfiguration message. Additionally, the present disclosure presents example apparatuses, computer-readable media, and processors for performing such example methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
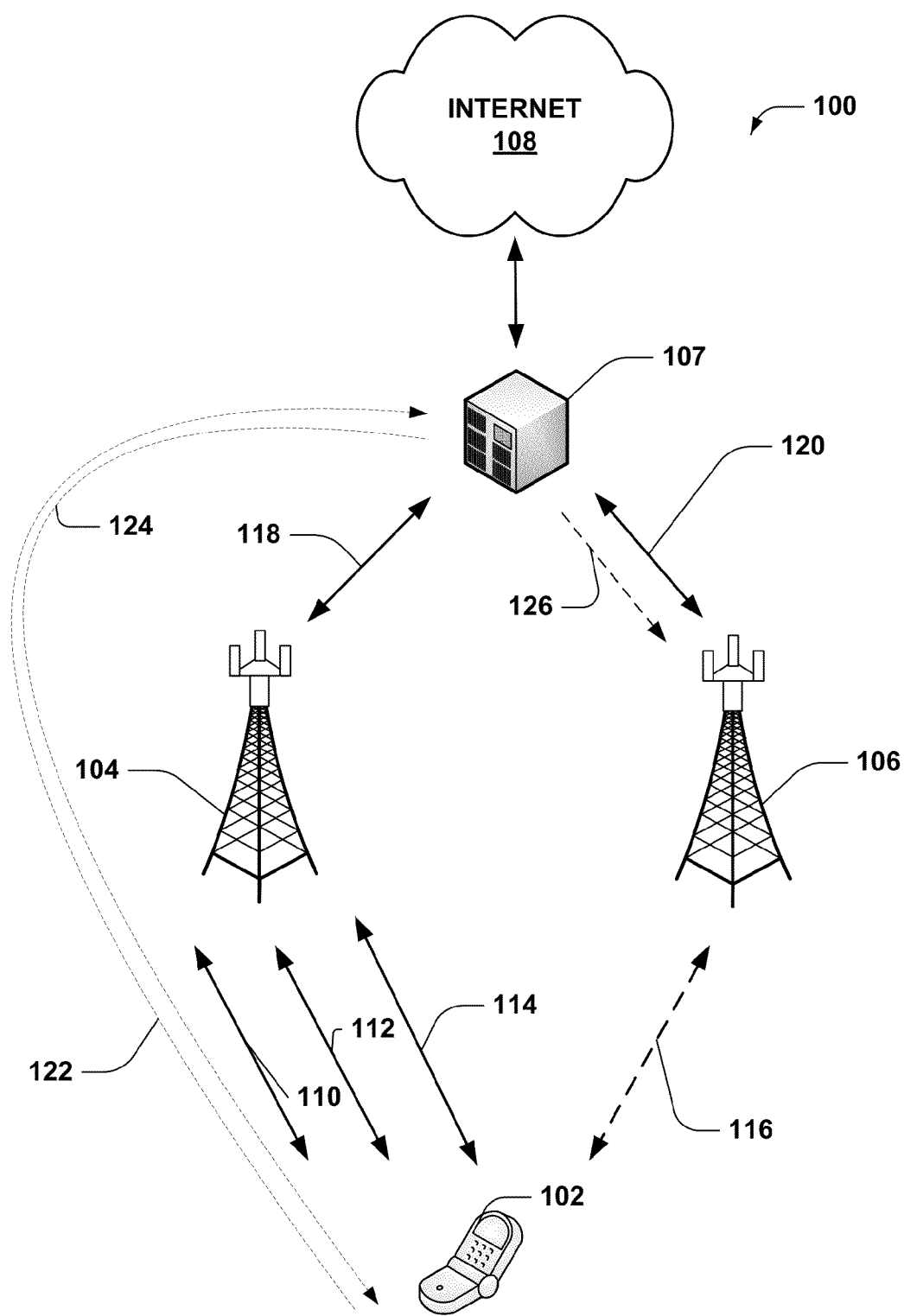
FIG. 1 is a system-level diagram of an aspect of a wireless environment that facilitates selective communication channel reset and/or transfer.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The described aspects include apparatus and methods of selectively resetting less than all communication channels established between a UE and one or more base stations. Specifically, the example apparatuses and methods described below may include receipt an indicator that triggers selective channel transfer of less than all communication channels. This indicator may occur upon a determination by the UE and/or the network (e.g. base station or other network entity) that better conditions exist for the channel on a cell different from a current serving cell. The indicator may explicitly or implicitly signal which communication channels are to be reset. Thus, the aspects disclosed below allow for selective reset of one or more established communication channels.

FIG. 1 illustrates an example wireless environment 100 that may perform selective channel reset and/or transfer. In an aspect, a serving cell base station 104 or controller 107 may establish one or more communication channels (110, 112, 114) with user equipment (UE) 102 to provide services from, for example, the Internet 108 via communication links 118 and/or 120. Furthermore, in some examples, any or all of communication channels 110, 112, and 114 may include High Speed Media Access Control (MAC-HS) channels, though one or more of these channels may be any HSPA channel or a wireless channel of any radio access technology type. Additionally, in some non-limiting examples, controller 107 may be a Radio Network Controller (RNC).

Furthermore, UE 102 may have multi-channel communicative capability, thereby allowing UE 102 to communicate with the network on several communication channels. In an aspect, each of the established communication channels 110, 112, 114 may communicate with serving cell base station 104 via different cells or sectors, but may also all communicate via the same cell. In addition, communication channels 110, 112, and/or 114 may have a corresponding carrier frequency that is unique to the channel upon with communication occurs on each channel. It should be noted that while FIG. 1 illustrates all communication channels, e.g. channels 110, 112, and 114, being served initially by a single base station, the described aspects may include more than one base station serving some portion of all of the channels.

In an aspect, some or all base stations of example wireless environment 100 may provide service to one or more associated service areas. Each of these service areas may be referred to as a cell, a sector, or other term denoting a sub-area of a base station coverage area or sphere. In an aspect, each channel (e.g. channels 110, 112, 114) of wireless environment 100 may have particular cell with which it is currently associated, which will be referred to herein as a "serving cell." Furthermore, controller 107 may monitor one or more cells other than the serving cell to determine whether communication properties associated with the channel frequency, or carrier, are superior or inferior to those of the serving cell. For purposes of the present disclosure, each of these monitored cells may be referred to as a "candidate cell," and may be serviced by another base station, represented in FIG. 1 by candidate cell base station 106. In some non-limiting network configuration examples, however, base stations may include more than one (e.g. three) defined sectors or cells. Thus, in some examples (not shown in FIG. 1), the serving cell and the candidate cell may be serviced by the same base station or other network entity.

Furthermore, for purposes of the present disclosure, a cell may include an entire service area of a base station, a subset of a total service area or service capacity associated with a base station, may be synonymous with one or more base station sectors, or may serve a greater or lesser area or greater or fewer UEs than a base station sector. Additionally, in an aspect, a cell may be associated with a corresponding unique frequency, though cells serviced by the same base station or different base stations may also utilize the same frequency for multiple cells.

In operation, as UE 102 moves throughout wireless environment 100, UE 102 may monitor channel conditions associated with each of its established communicative connections with one or more cells served by one or more base stations (e.g. serving cell base station 104 and candidate cell base station 106) in a UE active set, monitored set, and/or detected set of cells. In a non-limiting aspect, the active set, monitored set, and/or detected set may include any combination of serving base stations, neighbor base stations, sectors, or cells within a communicative range of UE 102.

Furthermore, UE 102 may periodically transmit one or more measurement reports 122 to controller 107 that may indicate channel conditions, such as, but not limited to, signal strength, for each channel on each base station or for each cell with which the UE 102 is communicating, monitoring, and/or has detected (e.g. each cell within range). In an aspect, controller 107 may determine that better communicative conditions exists for one or more channels on a base station or cell other than serving cell base station 104, such as a candidate cell serviced by candidate cell base station 106. For example, controller 107 may receive information from UE 102 in measurement report 122 that better communicative conditions exist for communication channel 112 on a candidate cell of candidate cell base station 106. As a result, controller 107 may decide that communication channel 112 having a serving cell serviced by serving cell base station 104 should be reset and transferred to the candidate cell for network communication service.

To accomplish the transfer of communication channel 112 to candidate cell base station 106, controller 107 may generate an channel reconfiguration message 124 that may communicate to UE 102 that at least one communication channel, such as communication channel 112 should be selectively reset on an individual, channel-specific basis. In some aspects, the channel reconfiguration message 124 may be a Physical Channel Reconfiguration (PCR) message. For example, the message may contain one or more reset flags (e.g. mac-hsResetIndicator flags) corresponding to one or more particular channels that are to be reset. In other words, according to an exemplary aspect, each reset flag added to a channel reconfiguration message may correspond uniquely to a particular channel associated with the serving cell or a UE served by the serving cell. In an aspect, this may include configurations such as, but not limited to, where a serving cell and/or UE has a single associated channel or a set of multiple associated channels, where the particular channel to which the reset flag corresponds may be one of the multiple associated channels. Therefore, according to some examples presented herein, the reset flag may instruct the UE to reset a subset of a set of channels associated with the serving cell and/or UE, and the subset may include the channel targeted for resetting. Thus, a specified subset of channels associated with the user equipment may be reset, which reduces the signaling load, complexity, and power drain associated with legacy channel reset methods and apparatuses.

In another aspect, the channel reconfiguration message 124 may be associated with a change in Transmission Power Control (TPC) Combination Index in the at least one communication channel. It should be noted, however, that the PCR and TPC Combination Index are examples, and the described aspects may include any form of providing channel reconfiguration message 124 to UE 102.

Additionally, in some aspects, controller 107 may send a handoff indication message 126 to candidate cell base station 106, where the handoff indication message 126 signals to candidate cell base station 106 that the one or more channels will be reset by UE 102 and transferred to candidate cell base station 106. Once UE 102 has received the channel reconfiguration message 124, UE 102 may reset the at least one communication channel (e.g. channel 112) based on the received channel reconfiguration message 124.

Furthermore, in one aspect, UE 102 may initiate the resetting and transferring of the one or more indicated communication channels (e.g. communication channel 112 in FIG. 1) with candidate cell base station 106. In other aspects, candidate cell base station 106 may initiate setup of a transferred communication channel 112 (indicated in FIG. 1 as dotted channel 116), and in some examples may do so based on the handoff indication message 126. In any case, once channel 116 is established, and handoff performed between serving cell base station 104 and candidate cell base station 106, the candidate cell may provide wireless communication services for UE 102 via communication channel 116.

Figure 2:
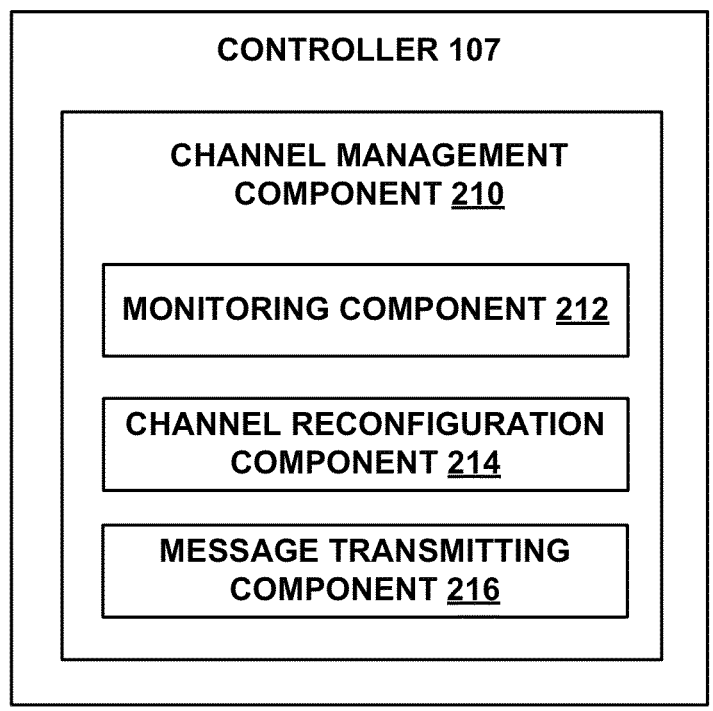
FIG. 2 is a block diagram showing components of an example controller of the present disclosure.

Referring to FIG. 2, in one aspect, a controller 107 for controlling base station operation and channel transfer between base stations is shown. Controller 107 includes a channel management component 210 for managing the transfer of one or more, or all, communication channels of a UE from a serving cell to a candidate cell, which may involve a transfer from a serving cell base station to a candidate base station.

Furthermore, in an aspect, channel management component 210 may include a monitoring component 212, which may be configured to determine that one or more communication channels associated with one or more UEs should be transferred to a cell or base station other than a serving cell or serving base station. In an aspect, monitoring component may receive one or more measurement reports from one or more UEs or base stations and may be configured to process data contained in the measurement reports determination as to whether a candidate cell exhibits superior communication properties for a particular communication channel or carrier. In an aspect, monitoring component 212 may receive and/or store the one or more received measurement reports for historical data keeping and/or for later analysis by monitoring component 212.

Additionally, in an aspect, controller 107 and/or channel management component 210 may include a channel reconfiguration component 214, which may be configured to generate one or more channel reconfiguration messages. In an aspect, channel reconfiguration component 214 may be configured to add one or more reset flags to the one or more channel reconfiguration messages, which may serve as a channel-specific indicator to a destination UE that one or more communication channels should be reset and/or transferred to a candidate cell. For example, channel reconfiguration component 214 may receive information from monitoring component 212 that indicates that communication properties of a carrier at a candidate cell are better for a communication channel that is currently active and served by a serving base station. Upon receiving this information from monitoring component 212, channel reconfiguration component 214 may initiate the generation of a message channel reconfiguration message.

Alternatively, in examples where the assembly of a channel reconfiguration message is already in progress, channel reconfiguration component 214 may construct and add a reset flag to the channel reconfiguration message. This reset flag may indicate, either explicitly or implicitly, that a specific communication channel or channels associated with a UE should be reset and/or transferred. For example, the flag may comprise, in some instances, a single bit for each active serving cell or serving cell base station channel. In some aspects, the channel reconfiguration message and/or one or more reset flags may include a channel-specific Physical Channel Reconfiguration (PCR) message or mac-hsResetIndicator flag. In other aspects, the channel reconfiguration message and/or one or more reset flags may be associated with a change in Transmission Power Control (TPC) Combination Index.

Furthermore, channel reconfiguration component 214 may be configured to initiate and manage cell handoff processes associated with the transfer of one or more channels from a serving cell to a candidate cell. In examples contemplated by the present disclosure, such handoff may include any of hard handoff, soft handoff, softer handoff, or any other form of serving cell, sector, or base station adjustment. In an aspect, channel reconfiguration component 214 may inform and/or instruct a base station, UE, or the like to transfer a channel to another base station, for example, by generating one or more cell transfer instructions and/or cell identifiers. Each cell transfer instruction may command a base station or UE to transfer or hand off a channel to and/or from a cell indicated by a cell identifier. In some examples, channel reconfiguration component 214 may add one or more of these cell transfer instructions and/or channel identifiers to a channel reconfiguration message.

In a further aspect, channel management component 210 may also include a message transmitting component 216, which may be configured to transmit messages to one or more other devices in a wireless communication environment. For example, message transmitting component 216 may be configured to transmit one or more channel reconfiguration messages to one or more destination UEs and/or base stations.

Figure 3:
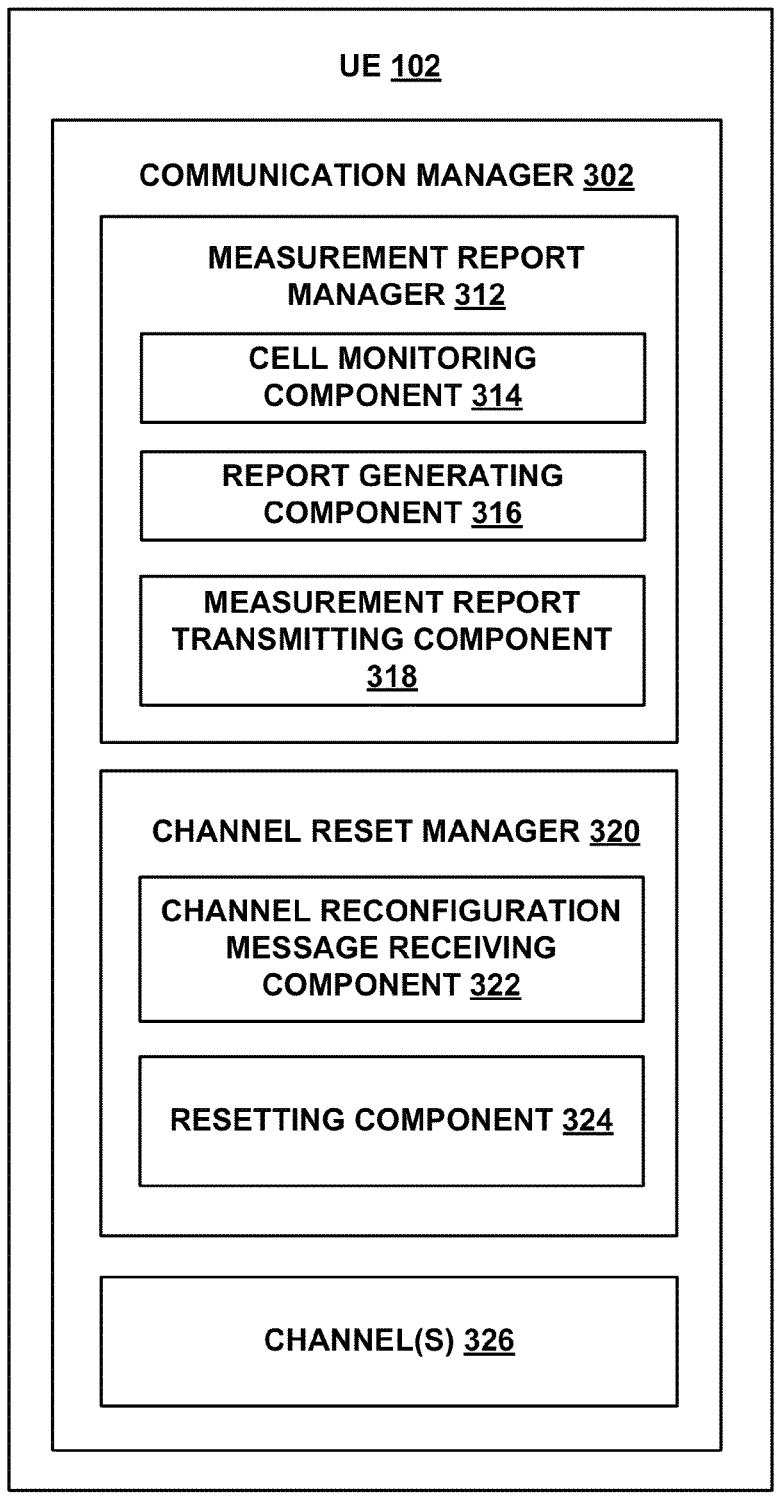
FIG. 3 is a block diagram showing components of an example user equipment of the present disclosure.

FIG. 3 represents an example UE 102 of the present disclosure, which may be configured to communicate with one or more base stations, controllers (e.g. controller 107 of FIGS. 1 and 2, RNCs), or other network devices in a wireless communication environment. In an aspect, UE 102 can communicate via multiple communicative channels that may be associated with the same or different cells. Furthermore, UE 102 may be operable to communicate via single frequency dual carrier (SFDC) or dual frequency dual carrier (DFDC) technology, though other communication technologies or standards may also be implemented.

In an aspect, UE 102 may include a communication manager 302, which may be configured to manage communication with one or more external devices and networks. In an aspect, communication manager 302 may include a measurement report manager 312, which may be configured to monitor properties of one or more cells, and generate and transmit a measurement report to one or more devices. For example, measurement report manager 312 may include a cell monitoring component 314, which may be configured to continuously monitor a wireless network environment for available base stations and/or candidate cells thereof and may further monitor the communication properties of a serving base station and/or an associated serving cell. Furthermore, cell monitoring component 314 may be configured to add one or more cells or base stations to an active set, monitored set, and/or detected set of cells associated with a UE 102. In addition, cell monitoring component 314 may be configured to monitor one or more specific frequencies upon which communication is conducted between a cell or its associated base station (e.g. serving cell base station 104 and/or candidate cell base station 106 of FIG. 1) and one or more UEs (e.g. UEs 102 of FIG. 1). Additionally, for purposes of the present disclosure, each these specific frequencies may be referred to as a "carrier" or "carriers," collectively, such as, but not limited to the specific frequencies, or "carriers," associated with channels 326 that are active between a serving cell and UE 102. Furthermore, these channels 326 are illustrated in FIG. 3 to illustrate that UE 102 may monitor, track, and/or save information or data associated with each channel 326 currently associated with UE 102. In an example aspect, these channels 326, which may include zero, one, or multiple channels and/or their associated communication frequencies or carriers, may correspond to channels 110, 112, and 114 of FIG. 1.

In an aspect, measurement report manager 312 may further include a report generating component 315, which may be configured to compile any cell data created by the cell monitoring component 314. Additionally, measurement report manager 312 may include a measurement report transmitting component 318, which may be configured to transmit the one or more measurement reports generated by report generating component 315 to one or more network entities, which may include, but are not limited to, base stations and controllers (e.g. RNCs). Alternatively or additionally, measurement report manager 312 may save the results of the monitoring in memory (e.g. memory 404 and/or data store 408 of FIG. 4) for later retrieval.

In addition, communication manager 302 may contain a channel reset manager 320, which may be configured to reset alone or more channels 326 associated with UE 102. In some examples, channel reset manager 320 may include a channel reconfiguration message receiving component, which may be configured to receive and/or process one or more channel reconfiguration messages associated with channel(s) 326. Furthermore, channel reset manager 320 may include a resetting component 324, which may be configured to reset one or more channels 326 associated with one or more reset flags that may be contained in a received channel reconfiguration message.

Figure 4:
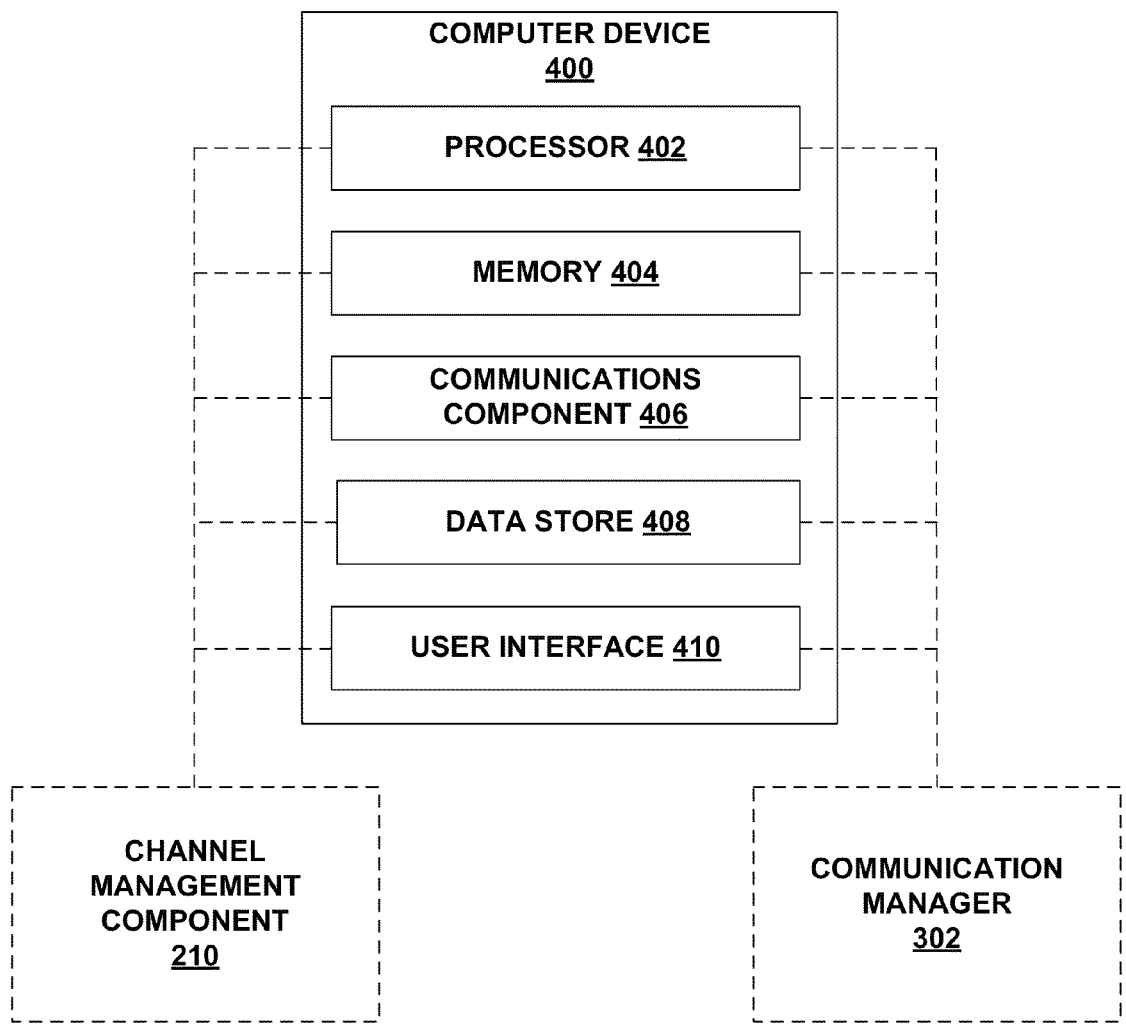
FIG. 4 is a block diagram showing components of an example generic computer device of the present disclosure

Referring to FIG. 4, in one aspect, any of UE 102 (FIG. 1), or one or more network entities, such as controller 107 (FIGS. 1 and 2) may be represented by a specially programmed or configured computer device 400. Computer device 400 includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system, and/or may be a digital signal processor (DSP), application-specific integrated circuit (ASIC), or any other processor or integrated circuit (IC), such as, but not limited to, ICs customized for one or more specific uses (e.g. wireless communication signal processing). Additionally, processor 402 may be configured to concatenate data received over a frame or several frames during a communication.

Computer device 400 further includes a memory 404, such as for storing data used herein and/or local versions of applications being executed by processor 404. Memory 404 can include any type of memory usable by a computer, such as random access memory (RAM), read only memory (ROM), tapes, magnetic discs, optical discs, volatile memory, non-volatile memory, and any combination thereof.

Further, computer device 400 includes a communications component 406 that provides for establishing and maintaining communications with one or more parties utilizing hardware, software, and services as described herein. Communications component 406 may carry communications between components on computer device 400, as well as between computer device 400 and external devices, such as devices located across a communications network and/or devices serially or locally connected to computer device 400. For example, communications component 406 may include one or more buses, and may further include transmit chain components and receive chain components associated with a transmitter and receiver, respectively, or a transceiver, operable for interfacing with external devices. In an additional aspect, communications component 406 may be configured to receive one or more pages and/or page indicators from one or more subscriber networks. In a further aspect, such a page or page indicator may correspond to the second subscription and may be received via the first communication technology type communication services.

Additionally, computer device 400 may further include a data store 408, which can be any suitable combination of hardware and/or software, that provides for mass storage of information, databases, and programs employed in connection with aspects described herein. For example, data store 408 may be a data repository for applications not currently being executed by processor 404.

Computer device 400 may additionally include a user interface component 410 operable to receive inputs from a user of computer device 400, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Furthermore, in a controller (e.g. controller 107) implementation of computer device 200, a channel management component 210 of controller 107 may be an additional component of computer device 200. Additionally, in a UE implementation of computer device 200, a communication manager 302 of UE 102 may be an additional component of computer device 200.

Figure 5:
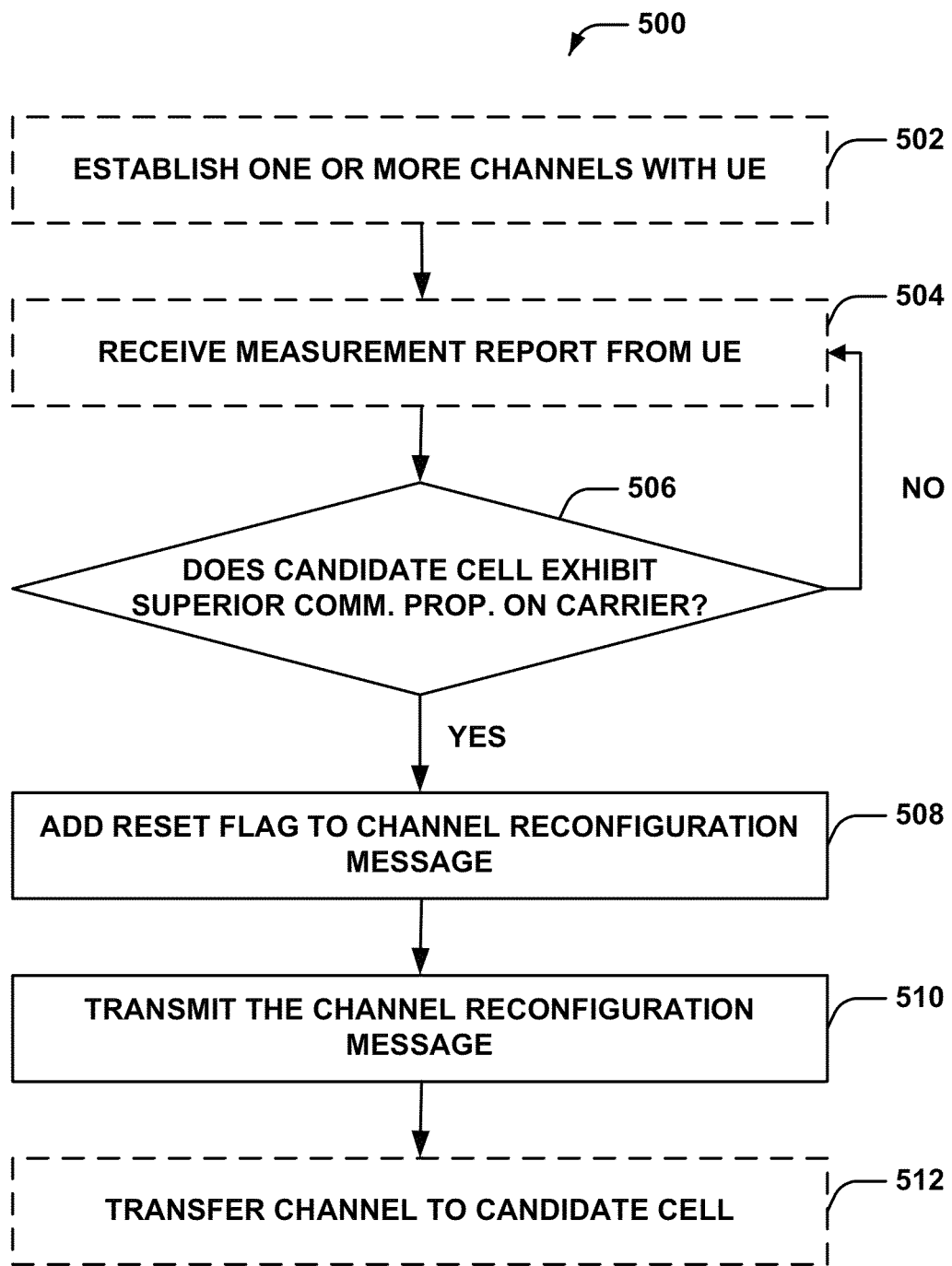
FIG. 5 is a flow chart illustrating an aspect of a method of selectively resetting and/or transferring one or more communication channels associated with a network device.

FIG. 5 illustrates an example methodology 500 for selectively resetting and/or transferring channels associated with a UE. For simplicity of explanation, FIG. 5 will be discussed with reference to the above-discussed FIGS. 2-4. Initially, a controller or serving base station (e.g. via communications component 406) may optionally establish one or more of a plurality of channels associated with a user equipment at block 502. In an aspect, the UE and the serving base station may have previously established other channels between the devices. However, at block 502, the controller and/or serving base station may establish further channels with the UE. Furthermore, in an aspect, each of the plurality of channels established between the devices may correspond to a different cell. In addition, in an aspect, the plurality of channels may include one or more high-speed Media Access Control (MAC-HS) channels.

In an aspect, at block 504, a controller or a component therein, such as, but not limited to monitoring component 212 of FIG. 2, may receive a measurement report from one or more UEs that may indicate that one or more communication properties associated with one or more candidate cells are superior to those of the serving cell. In some examples, the controller (e.g. via monitoring component 212) may determine based on the measurement report that better conditions would not exist for a channel if that channel were to be transferred to another cell. In this case, the controller may simply wait to receive a subsequent measurement report from the UE.

Alternatively, in some aspects, based on the information contained in a measurement report, the controller (e.g. via monitoring component 212) may determine that the communication properties associated with the base station-UE communication connection are inferior in some respect to a communicative connection that could be established in the future between the UE and a candidate cell at block 506. For example, the superior communication properties associated with the candidate cell may be one or more of, but are not limited to, in signal strength, bandwidth, throughput, or other communication condition, though these example condition examples are not exclusive. As an example, a candidate cell may be deemed to have superior communications properties if the signal strength of a carrier detected by the UE from the candidate cell is higher than the signal strength of the carrier received by the UE from the serving cell. It should be noted that this is but one example of how a UE may determine that a candidate cell has superior communications properties, and in other examples, a UE (e.g., a controller of the UE) may determine that a candidate cell has superior communication properties if, for example, the carrier of the signal from the candidate cell has a greater bandwidth, can provide a higher throughput than the carrier from the serving cell. As noted above, these are but some example superior communication properties and in other examples, other communication properties may be used to determine whether the candidate cell has superior communications properties. In the event the controller determines that the candidate cell has superior communications properties over that of the serving cell, the controller may determine that one or more channels should be reset and/or transferred to another base station.

In some aspects, the controller may possess stored information pertaining to a transmission power control combination index (TPC CI) corresponding to each channel. In advanced wireless communication networks, every channel established between a base station and a UE is assigned an associated TPC CI. Furthermore, each communication connection associated with a given base station is assigned the same TPC CI. For example, all communication connections associated with a serving base station, which may belong to one or more cells of the same base station, may have a TPC CI of "1" and all communication connections associated with a second base station may have a TPC CI or "3."

In an aspect, the network (e.g., its network controller) is aware of the TPC CI of a given base station or cell. Additionally, a UE may be aware of the TPC CI associated with a particular cell—for example the cell on which a UE is currently camped, such as the serving cell, or a nearby cell that may be a candidate for handoff for a channel, such as the candidate cell. As a UE monitors adjacent cells in a network, therefore, the UE is able to compare a current cell TPC CI to the TPC CI of the candidate cell. In an aspect, a controller may indicate to a UE that channel reset should be based upon this comparison. By this aspect, if the UE-measured TPC CIs of a current serving cell and a candidate cell do not differ, the base station may not reset the particular channel. Alternatively, if the controller indicates that channel reset should be based on TPC CI measurement and comparison and a candidate cell (or a cell to which the communication cell is commanded to be moved) has a different TPC CI value than the current cell, the UE may reset that particular channel. In this aspect, therefore, a channel-specific mac-hsResetIndicator flag or the like is unneeded from the controller, as the UE may independently reset a channel or channels if a TPC CI changes. Therefore, in an aspect, the determination may be based upon one or more TPC CI values received or maintained by the UE and/or controller.

Where the controller makes a determination that a candidate cell exhibits superior communication properties on a carrier or corresponding channel, the controller (e.g. via channel reconfiguration component 214 of FIG. 2) may add a reset flag to a channel configuration message at block 508 based on information contained in the one or more received measurement reports. In an aspect the reset flag may be an indicator relating to selectively resetting and/or transferring explicitly or implicitly identified ones, e.g. which may be all or less than all of the plurality of channels, to a candidate cell. In some aspects, the indicator may include a flag, such as, but not limited to, a channel-specific mac-hsResetIndicator flag. Additionally, the indicator may be generated in the form of a message such as, but not limited to, a Physical Carrier Reconfiguration (PCR) message, a transmission channel reconfiguration message, or a radio bearer reconfiguration message.

In addition, the controller (e.g. via message transmitting component 216 of FIG. 2) may transmit the channel reconfiguration message, for example, to a UE, at block 510. In some aspects, the message may be an over-the-air (OTA) message that may include an indication of which channels are to be reset and/or transferred and/or a command to perform the selective channel reset and/or transfer. The message may be a PCR message in some aspects, or may include a plurality of channel-specific mac-hsResetIndicator flags—one for each established channel to be reset. In other aspects, as noted above, the indicator may be in a message associated with commanding a UE to reset a channel based on a change in Transmission Power Control (TPC) Combination Index in the selected channels.

In some aspects, the overall channel reconstruction message may include two or more messages—one message that indicates which channels are to be reset and/or transferred and a subsequent message that commands the UE to perform the reset and/or transfer, or vice versa. For example, in some aspects, the controller may transmit a first message at time t1 selectively indicating that channel c1 is to be reset when the UE receives a global reset and/or transfer command, and a second message at time t2 selectively indicating that channel c2 is to be reset when the UE receives the global reset and/or transfer command. The UE may store these selective channel reset/transfer indicators in a UE memory. Thereafter, at time t3, the controller and/or other network device may generate and send a global reset and/or transfer command message to the UE, where upon receipt of the global message, the UE resets and/or transfers any channels—here, channels c1 and c2—that have been previously indicated for reset and/or transfer. Furthermore, in some optional examples, the controller may itself perform the transfer of the selected channel or channels to the candidate cell at block 512.

Furthermore, in an aspect, the various method steps associated with the blocks of FIG. 5 may be performed by, but are not limited to being performed by, one or more components of FIG. 2, processor 402 of FIG. 4., which may execute instructions that may be stored in memory 404 or data store 408, for example, or any other electrical component capable of performing the method steps. Thus, it is understood that, although particular components are mentioned with reference to performing the method steps of FIG. 5, the performance of these steps is not limited to such components.

Figure 6:
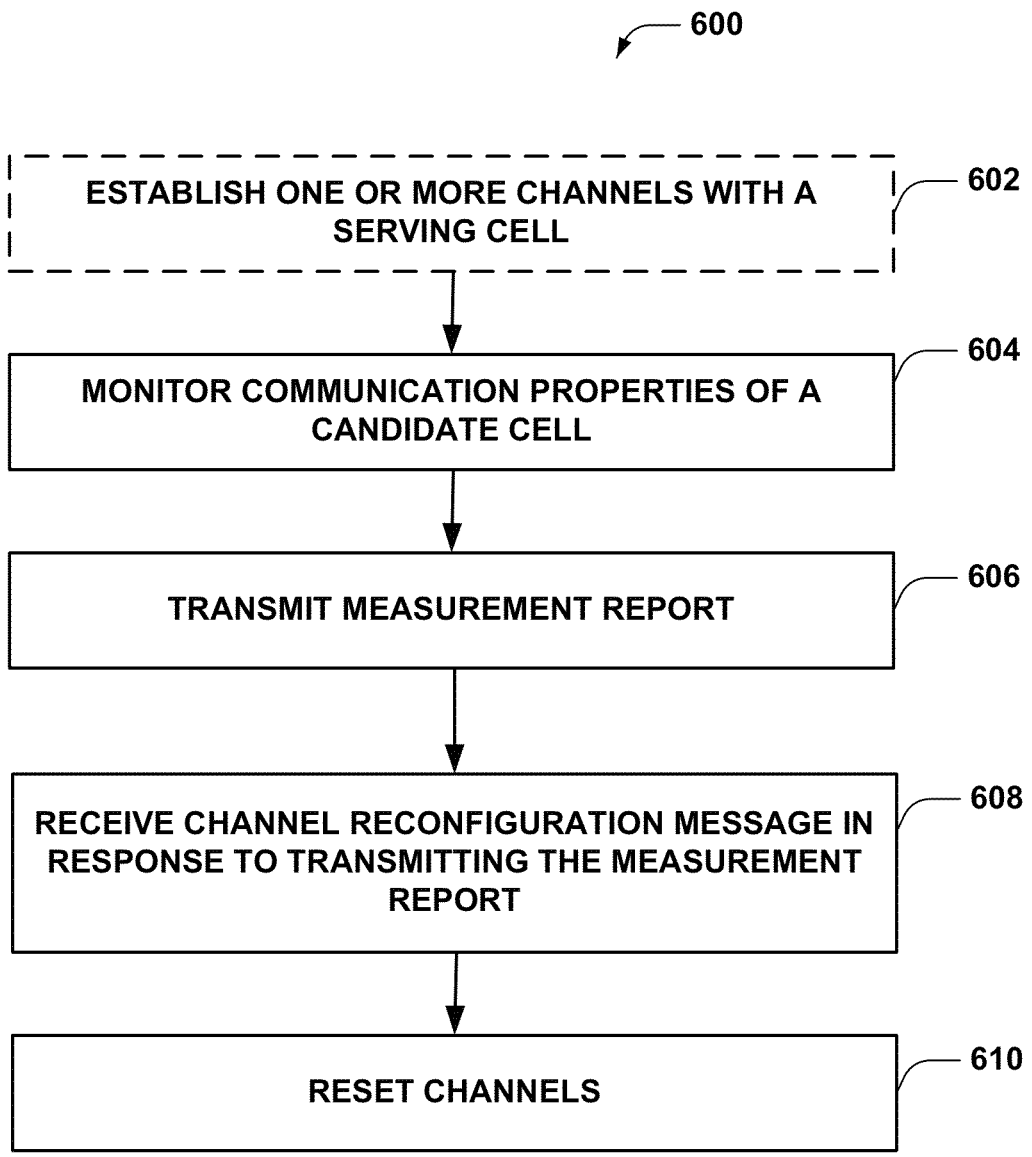
FIG. 6 is a is a flow chart illustrating an aspect of a method of selectively resetting and/or transferring one or more communication channels associated with a user equipment.

Turning to FIG. 6, a method for selective reset and/or transfer of one or more channels is provided. Initially, at optional block 602, a UE (e.g. via communications component 406 of FIG. 4) may establish one or more of a plurality of channels associated with a serving cell. In an aspect, the UE and the serving cell may have previously established other channels between the devices. In addition, at block 604, the UE (e.g. via cell monitoring component 314 of FIG. 3) may monitor communication properties associated with one or more base stations or candidate cells. For example, the UE may monitor communication properties associated with the different cells and/or base stations such as, but not limited to, signal strength, bandwidth, throughput, base station load, or other communication condition. Furthermore, the UE may monitor communication properties associated with particular channel frequencies or carriers at all base stations in its active set, monitored set, and/or detected set, including those channel frequencies that correspond to frequencies upon which channels have been established between the UE and the serving cell. Additionally, the UE may monitor and store the TPC CI associated with all cells upon which channels have been established for the UE.

Furthermore, in an aspect, at block 606 the UE (e.g. via measurement report transmitting component 318 of FIG. 4) may transmit a measurement report to the controller (e.g. via a base station) that may include information compiled through the UE monitoring in block 604. Additionally, in an example method, the UE may retrieve information from a memory in the UE to send to the controller in the measurement report. The measurement report may be provided, in some aspects, in an over-the-air (OTA) message.

In an aspect, the UE (e.g. via channel reconfiguration message receiving component 322) may receive a channel reconfiguration message, for example, in response to transmitting the measurement report, relating to selectively resetting and/or transferring alone or more of UE-associated channels at block 608. In an aspect, one or more reset flags may be included in the received channel reconfiguration message. In a further aspect, the channel reconfiguration message may be provided in an OTA message, and may include one or more of particular message format such as, but not limited to, a Physical Carrier Reconfiguration (PCR) message, a channel-specific mac-hsResetIndicator flag, a transmission channel reconfiguration message, or a radio bearer reconfiguration message. In other aspects, the reset flags may be in a message associated with resetting channels upon a change in Transmission Power Control (TPC) Combination Index in the selected channels. Furthermore, at block 610, the UE (e.g. via resetting component 324) may reset the reset-flag-identified channels, which may be all or less than all of the plurality of channels, as indicated in the channel reconfiguration message received in block 608.

Furthermore, in an aspect, the various method steps associated with the blocks of FIG. 6 may be performed by, but are not limited to being performed by, one or more components of FIG. 3, processor 402 of FIG. 4., which may execute instructions that may be stored in memory 404 or data store 408, for example, or any other electrical component capable of performing the method steps. Thus, it is understood that, although particular components are mentioned with reference to performing the method steps of FIG. 6, the performance of these steps is not limited to such components.

Figure 7:
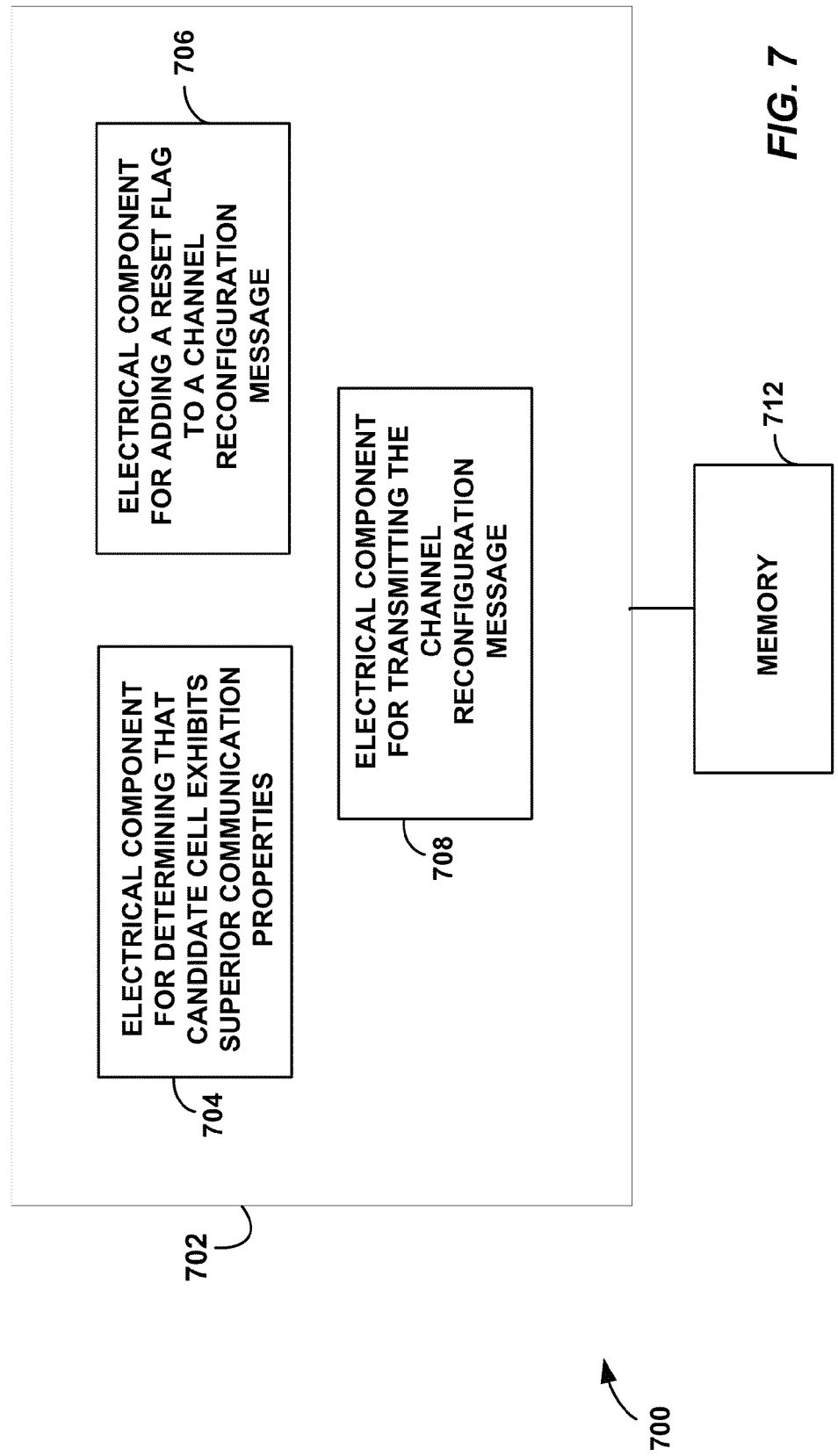
FIG. 7 is a block diagram illustrating a logical grouping electrical components of an aspect of a network device contemplated herein.

Referring to FIG. 7, an example system 700 is displayed for selectively resetting and/or transferring one or more channels. For example, system 700 can reside at least partially within a device. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For example, logical grouping 702 can include an electrical component 704 for determining that a candidate cell exhibits superior communication properties. For example, component 704 may be monitoring component 212 (FIG. 2). Logical grouping 702 can also include an electrical component 706 for adding a reset flag to a channel reconfiguration message. For example, component 706 may be channel reconfiguration component 214 (FIG. 2). Moreover, logical grouping 702 may contain an electrical component 708 for transmitting the channel reconfiguration message. For example, component 708 may be message transmitting component 216 (FIG. 2).

Additionally, system 700 can include a memory 712 that retains instructions for executing functions associated with the electrical components 704, 706, and 708, stores data used or obtained by the electrical components 704, 706, and 708, etc. While shown as being external to memory 712, it is to be understood that one or more of the electrical components 704, 706, and 708 can exist within memory 712. In one example, electrical components 704, 706, and 708 can comprise at least one processor, or each electrical component 704, 706, and 708 can be a corresponding module of at least one processor. Moreover, in an additional or alternative example, electrical components 704, 706, and 708 can be a computer program product including a computer readable medium, where each electrical component 704, 706, and 708 can be corresponding code.

Figure 8:
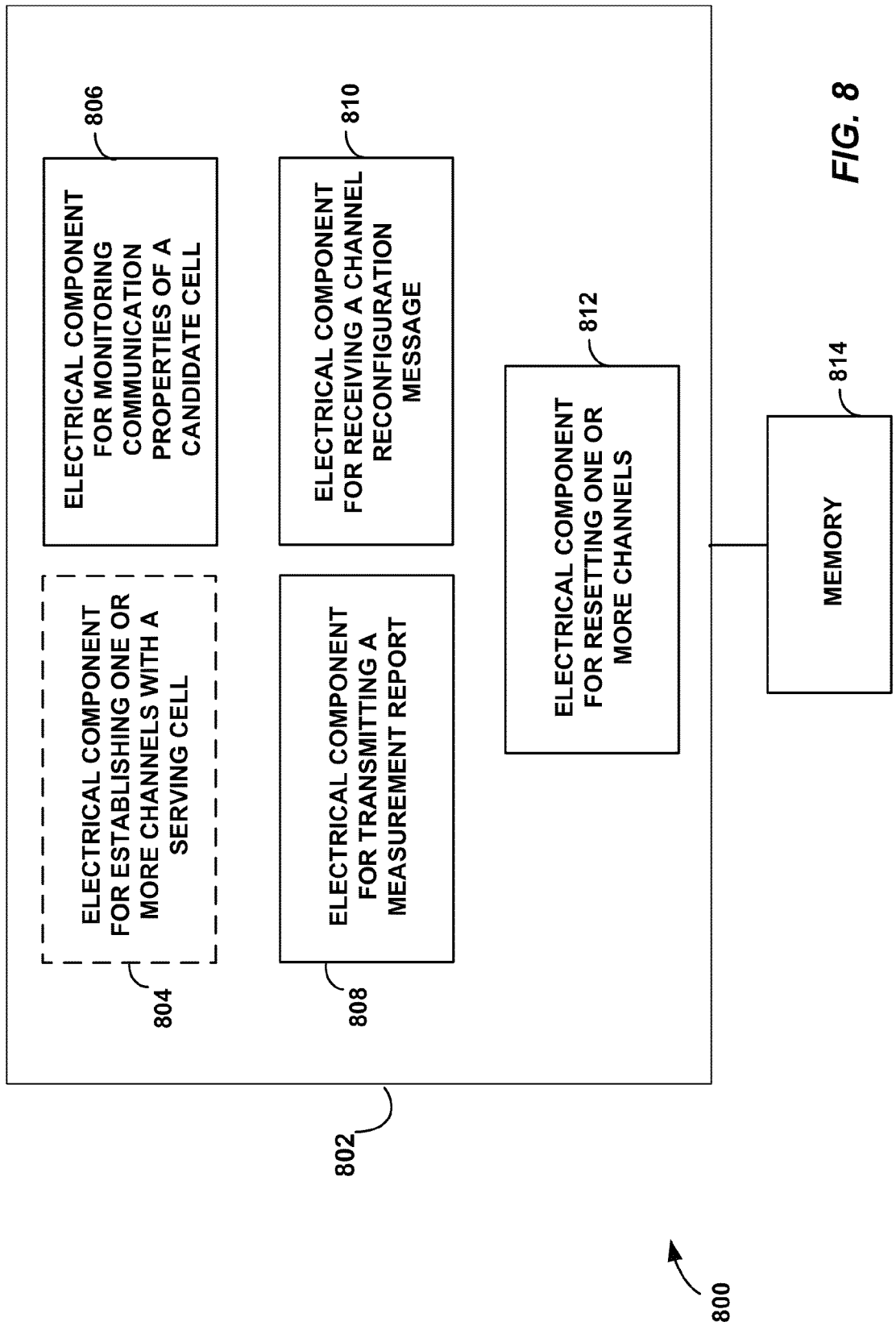
FIG. 8 is a block diagram illustrating a logical grouping of electrical components in an example UE described in the present disclosure.

Referring to FIG. 8, an example system 800 is displayed for selectively resetting one or more channels. For example, system 800 can reside at least partially within a device. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For example, logical grouping 802 can include an optional electrical component 804 for establishing one or more channels with a serving cell. For example, component 804 may be communications component 406 (FIG. 4). Logical grouping 802 can also include an electrical component 806 for monitoring communication properties of a candidate cell. For example, component 806 may cell monitoring component 312 (FIG. 3). Moreover, logical grouping 802 may contain an electrical component 808 for transmitting a measurement report. For example, component 808 may be measurement report transmitting component 318 (FIG. 3). Moreover, logical grouping 802 may contain an electrical component 810 for receiving a channel reconfiguration message. For example, component 810 may be channel reconfiguration receiving component 322 (FIG. 3). Logical grouping 802 may further contain an electrical component 812 for resetting one or more channels. For example, component 812 may be resetting component 324 (FIG. 3).

Additionally, system 800 can include a memory 814 that retains instructions for executing functions associated with the electrical components 804, 806, 808, 810, and 812, stores data used or obtained by the electrical components 804, 806, 808, 810, and 812, etc. While shown as being external to memory 814, it is to be understood that one or more of the electrical components 804, 806, 808, 810, and 812 can exist within memory 814. In one example, electrical components 804, 806, 808, 810, and 812 can comprise at least one processor, or each electrical component 804, 806, 808, 810, and 812 can be a corresponding module of at least one processor. Moreover, in an additional or alternative example, electrical components 804, 806, 808, 810, and 812 can be a computer program product including a computer readable medium, where each electrical component 804, 806, 808, 810, and 812 can be corresponding code.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor (e.g., processor 402 of FIG. 4), or in a combination of the two. A software module may reside in a storage medium, such as, but not limited to, memory 404 and/or data store 408 of FIG. 4, which may include one or more of RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor (e.g., processor 402) and the storage medium (e.g., memory 404) may reside in an ASIC. Additionally, the ASIC may reside in a UE. In the alternative, the processor and the storage medium may reside as discrete components in a UE. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for selective channel reset, comprising:
   determining that a candidate cell exhibits superior communication properties on a carrier than does a serving cell, wherein the carrier corresponds to a channel in use by the serving cell, and wherein the superior communication properties comprise at least one of a higher signal strength, a greater bandwidth, and a higher throughput;
   adding, by a controller, a reset flag to a High Speed Media Access Channel (MAC-HS) reset message based on determining that the candidate cell exhibits the superior communication properties, wherein the reset flag instructs a user equipment to reset a subset of channels of a set of channels associated with the serving cell, wherein the subset of channels is less than all channels of the set of channels and includes the channel, and wherein the set of channels comprises a set of MAC-HS channels; and
   transmitting the MAC-HS reset message.

2. The method of claim 1, further comprising transferring the channel to the candidate cell based on the MAC-HS reset message.

3. The method of claim 2, further comprising transmitting a handoff indication message to the candidate cell.

4. The method of claim 1, wherein the MAC-HS reset message further comprises a cell transfer instruction and a channel identifier associated with the channel.

5. The method of claim 1, wherein the MAC-HS reset message is configured to indicate a change in a Transmission Power Control (TPC) Combination Index of the channel.

6. The method of claim 1, wherein the MAC-HS reset message comprises at least one Physical Channel Reconfiguration (PCR) message.

7. The method of claim 1, wherein the MAC-HS reset message comprises a plurality of reset flags, wherein each of the plurality of reset flags correspond to an additional channel in use by the user equipment.

8. The method of claim 7, wherein each of the plurality of reset flags is configured to instruct the user equipment to reset a corresponding channel of the subset of channels.

9. The method of claim 1, wherein the MAC-HS reset is an over-the-air message.

10. An apparatus, comprising:
a processor configured for selective channel reset;
a memory coupled to the processor and storing code executable by the processor, the code comprising:
code for determining that a candidate cell exhibits superior communication properties on a carrier than does a serving cell, wherein the carrier corresponds to a channel in use by the serving cell, and wherein the superior communication properties comprise at least one of a higher signal strength, a greater bandwidth, and a higher throughput;
code for adding, by a controller, a reset flag to a High Speed Media Access Channel (MAC-HS) reset message based on determining that the candidate cell exhibits the superior communication properties, wherein the reset flag is configured to instruct a user equipment to reset a subset of channels of a set of channels associated with the serving cell, wherein the subset of channels is less than all channels of the set of channels and includes the channel, and wherein the set of channels comprises a set of MAC-HS channels; and
code for transmitting the MAC-HS reset message.

11. The apparatus of claim 10, wherein the code further comprises code for transferring the channel to the candidate cell based on the MAC-HS reset message.

12. The apparatus of claim 11, wherein the code further comprises code for transmitting a handoff indication message to the candidate cell.

13. The apparatus of claim 10, wherein the MAC-HS reset message further comprises a cell transfer instruction and a channel identifier associated with the channel.

14. The apparatus of claim 10, wherein the MAC-HS reset message is configured to indicate a change in a Transmission Power Control (TPC) Combination Index of the channel.

15. The apparatus of claim 10, wherein the MAC-HS reset message comprises at least one Physical Channel Reconfiguration (PCR) message.

16. The apparatus of claim 10, wherein the MAC-HS reset message comprises a plurality of reset flags, wherein each of the plurality of reset flags correspond to an additional channel in use by the user equipment.

17. The apparatus of claim 16, wherein each of the plurality of reset flags is configured to instruct the serving cell to reset a corresponding channel of the subset of channels.

18. The apparatus of claim 10, wherein the MAC-HS reset message is an over-the-air message.

19. A non-transitory computer-readable medium comprising executable instructions for:
determining that a candidate cell exhibits superior communication properties on a carrier than does a serving cell, wherein the carrier corresponds to a channel in use by the serving cell, and wherein the superior communication properties comprise at least one of a higher signal strength, a greater bandwidth, and a higher throughput;
adding, by a controller, a reset flag to a High Speed Media Access Channel (MAC-HS) reset message based on determining that the candidate cell exhibits the superior communication properties, wherein the reset flag is configured to instruct a user equipment to reset a subset of channels of a set of channels associated with the serving cell, wherein the subset of channels is less than all channels of the set of channels and includes the channel, and wherein the set of channels comprises a set of MAC-HS channels; and
transmitting the MAC-HS reset message.

20. The non-transitory computer-readable medium of claim 19, further comprising executable code for transferring the channel to the candidate cell based on the MAC-HS reset message.

21. The non-transitory computer-readable medium of claim 20, further comprising executable code for transmitting a handoff indication message to the candidate cell.

22. The non-transitory computer-readable medium of claim 19, wherein the MAC-HS reset message further comprises a cell transfer instruction and a channel identifier associated with the channel.

23. The non-transitory computer-readable medium of claim 19, wherein the MAC-HS reset message is configured to indicate a change in a Transmission Power Control (TPC) Combination Index of the channel.

24. The non-transitory computer-readable medium of claim 19, wherein the MAC-HS reset message comprises at least one Physical Channel Reconfiguration (PCR) message.

25. The non-transitory computer-readable medium of claim 19, wherein the MAC-HS reset message comprises a plurality of reset flags, wherein each of the plurality of reset flags correspond to an additional channel in use by the user equipment.

26. The non-transitory computer-readable medium of claim 25, wherein each of the plurality of reset flags is configured to instruct the user equipment to reset a corresponding channel of the subset of channels.

27. The non-transitory computer-readable medium of claim 19, wherein the MAC-HS reset message is an over-the-air message.

28. An apparatus, comprising:
means for determining that a candidate cell exhibits superior communication properties on a carrier than does a serving cell, wherein the carrier corresponds to a channel in use by the serving cell, and wherein the superior communication properties comprise at least one of a higher signal strength, a greater bandwidth, and a higher throughput;
means for adding, by a controller, a reset flag to a High Speed Media Access Channel (MAC-HS) reset message based on determining that the candidate cell exhibits the superior communication properties, wherein the reset flag is configured to instruct a user equipment to reset a subset of channels of a set of channels associated with the serving cell, wherein the subset of channels is less than all channels of the set of channels and includes the channel, and wherein the set of channels comprises a set of MAC-HS channels; and
means for transmitting the MAC-HS reset message.

29. The apparatus of claim 28, further comprising means for transferring the channel to the candidate cell based on the MAC-HS reset message.

30. The apparatus of claim 29, further comprising means for transmitting a handoff indication message to the candidate cell.

31. The apparatus of claim 28, wherein the MAC-HS reset message further comprises a cell transfer instruction and a channel identifier associated with the channel.

32. The apparatus of claim 28, wherein the MAC-HS reset message is configured to indicate a change in a Transmission Power Control (TPC) Combination Index of the channel.

33. The apparatus of claim 28, wherein the MAC-HS reset message comprises at least one Physical Channel Reconfiguration (PCR) message.

34. The apparatus of claim 28, wherein the MAC-HS reset message comprises a plurality of reset flags, wherein each of the plurality of reset flags correspond to an additional channel in use by the user equipment.

35. The apparatus of claim 34, wherein each of the plurality of reset flags is configured to instruct the user equipment to reset a corresponding channel of the subset of channels.

36. The apparatus of claim 28, wherein the MAC-HS reset message is an over-the-air message.

37. A method for selective channel reset, comprising:
monitoring communication properties of a carrier of a candidate cell, wherein the carrier corresponds to a channel in use by a serving cell;
transmitting a measurement report reporting the communication properties, wherein the measurement report indicates that the candidate cell exhibits superior communication properties associated with the carrier relative to the serving cell, and wherein the superior communication properties comprise at least one of a higher signal strength, a greater bandwidth, and a higher throughput;
receiving a High Speed Media Access Channel (MAC-HS) reset message in response to transmitting the measurement report, wherein the MAC-HS reset message comprises one or more reset flags that are configured to instruct a user equipment to reset a subset of channels of a set of channels associated with the serving cell, wherein the one or more reset flags are added to the MAC-HS reset message by a controller associated with the serving cell and the candidate cell based on the measurement report indicating that the candidate cell exhibits the superior communication properties associated with the carrier relative to the serving cell, wherein the subset of channels is less than all channels of the set of channels and includes the channel, and wherein the set of channels comprises a set of MAC-HS channels; and
resetting the subset of channels based on the MAC-HS reset message.

38. An apparatus, comprising:
a processor configured for selective channel reset;
a memory coupled to the processor and storing code executable by the processor, the code comprising:
code for monitoring communication properties of a carrier of a candidate cell, wherein the carrier corresponds to a channel in use by a serving cell;
code for transmitting a measurement report reporting the communication properties, wherein the measurement report indicates that the candidate cell exhibits superior communication properties associated with the carrier relative to the serving cell, and wherein the superior communication properties comprise at least one of a higher signal strength, a greater bandwidth, and a higher throughput;
code for receiving a High Speed Media Access Channel (MAC-HS) reset message in response to transmitting the measurement report, wherein the MAC-HS reset message comprises one or more reset flags that are configured to instruct a user equipment to reset a subset of channels of a set of channels associated with the serving cell, wherein the one or more reset flags are added to the MAC-HS reset message by a controller associated with the serving cell and the candidate cell based on the measurement report indicating that the candidate cell exhibits the superior communication properties associated with the carrier relative to the serving cell, wherein the subset of channels is less than all channels of the set of channels and includes the channel, and wherein the set of channels comprises a set of MAC-HS channels; and
code for resetting the subset of channels based on the MAC-HS reset message.

39. A non-transitory computer-readable medium comprising executable instructions for:
monitoring communication properties of a carrier of a candidate cell, wherein the carrier corresponds to a channel in use by a serving cell;
transmitting a measurement report reporting the communication properties, wherein the measurement report indicates that the candidate cell exhibits superior communication properties associated with the carrier relative to the serving cell, and wherein the superior communication properties comprise at least one of a higher signal strength, a greater bandwidth, and a higher throughput;
receiving a High Speed Media Access Channel (MAC-HS) reset message in response to transmitting the measurement report, wherein the MAC-HS reset message comprises one or more reset flags that are configured to instruct a user equipment to reset a subset of channels of a set of channels associated with the serving cell, wherein the one or more reset flags are added to the MAC-HS reset message by a controller associated with the serving cell and the candidate cell based on the measurement report indicating that the candidate cell exhibits the superior communication properties associated with the carrier relative to the serving cell, wherein the subset of channels is less than all channels of the set of channels and includes the channel, and wherein the set of channels comprises a set of MAC-HS channels; and
resetting the subset of channels based on the MAC-HS reset message.

40. An apparatus, comprising:
means for monitoring, by a processor, communication properties of a carrier of a candidate cell, wherein the carrier corresponds to a channel in use by a serving cell;
means for transmitting a measurement report reporting the communication properties, wherein the measurement report indicates that the candidate cell exhibits superior communication properties associated with the carrier relative to the serving cell, and wherein the superior communication properties comprise at least one of a higher signal strength, a greater bandwidth, and a higher throughput;
means for receiving a High Speed Media Access Channel (MAC-HS) reset message in response to transmitting the measurement report, wherein the MAC-HS reset message comprises one or more reset flags that are configured to instruct a user equipment to reset a subset of channels of a set of channels associated with the serving cell, wherein the one or more reset flags are added to the MAC-HS reset message by a controller associated with the serving cell and the candidate cell based on the measurement report indicating that the candidate cell exhibits the superior communication properties associated with the carrier relative to the serving cell, wherein the subset of channels is less than all channels of the set of channels and includes the channel, and wherein the set of channels comprises a set of MAC-HS channels; and means for resetting the subset of channels based on the MAC-HS reset message.

* * * * *